(12) United States Patent
Kitawaki et al.

(10) Patent No.: US 12,243,570 B2
(45) Date of Patent: Mar. 4, 2025

(54) ALUMINUM ALLOY SUBSTRATE FOR MAGNETIC DISC AND MAGNETIC DISC

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Hideyuki Hatakeyama, Tokyo (JP); Wataru Kumagai, Tokyo (JP); Ryo Sakamoto, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 18/334,651

(22) Filed: Jun. 14, 2023

(65) Prior Publication Data
US 2024/0021213 A1  Jan. 18, 2024

Related U.S. Application Data

(63) Continuation of application No. PCT/JP2021/045825, filed on Dec. 13, 2021.

(30) Foreign Application Priority Data

Dec. 15, 2020 (JP) ................................. 2020-207707

(51) Int. Cl.
G11B 5/73 (2006.01)

(52) U.S. Cl.
CPC ................................ G11B 5/73919 (2019.05)

(58) Field of Classification Search
None
See application file for complete search history.

(56) References Cited

U.S. PATENT DOCUMENTS

| | | | | |
|---|---|---|---|---|
| 4,826,737 A | * | 5/1989 | Yamada | C22F 1/047 |
| | | | | 428/650 |
| 5,939,164 A | * | 8/1999 | Kubo | B32B 15/016 |
| | | | | 428/548 |
| 6,440,583 B1 | | 8/2002 | Ueno | B23K 35/286 |
| | | | | 420/547 |
| 10,755,738 B2 | * | 8/2020 | Kitawaki | C22C 21/06 |
| 11,404,082 B2 | * | 8/2022 | Kitawaki | C22C 21/00 |
| 2017/0327930 A1 | * | 11/2017 | Kitawaki | G11B 5/73919 |
| 2019/0172487 A1 | * | 6/2019 | Kitawaki | C22F 1/047 |
| 2020/0211595 A1 | * | 7/2020 | Yukimatsu | G11B 5/7371 |
| 2021/0012801 A1 | * | 1/2021 | Murata | C23C 18/54 |
| 2021/0050034 A1 | | 2/2021 | Murata et al. | |
| 2021/0201946 A1 | | 7/2021 | Kitawaki et al. | |
| 2021/0319806 A1 | * | 10/2021 | Kitawaki | C22C 21/00 |
| 2023/0111915 A1 | * | 4/2023 | Kitawaki | C22C 21/00 |
| | | | | 420/532 |
| 2023/0238027 A1 | * | 7/2023 | Kitawaki | G11B 5/84 |
| | | | | 428/846.7 |

FOREIGN PATENT DOCUMENTS

| | | | | |
|---|---|---|---|---|
| JP | 2017-179590 A | | 10/2017 | |
| JP | 2019-160384 A | | 9/2019 | |
| JP | 2020-29595 A | | 2/2020 | |
| JP | 2020045545 A | * | 3/2020 | ............... B21B 1/22 |
| JP | 2020-87485 A | | 6/2020 | |
| JP | 2021-93234 A | | 6/2021 | |
| JP | 2022-13061 A | | 1/2022 | |
| WO | 2016/068293 A1 | | 5/2016 | |
| WO | 2019/163239 A1 | | 8/2019 | |
| WO | 2019/171675 A1 | | 9/2019 | |
| WO | 2020/059742 A1 | | 3/2020 | |

OTHER PUBLICATIONS

JP-6492219-B1 Abstract Translation (Year: 2019).*
International Search Report dated Mar. 1, 2022 from corresponding International Patent Application No. PCT/JP2021/045825, 7 pages.
Written Opinion dated Mar. 1, 2022 from corresponding International Patent Application No. PCT/JP2021/045824, 10 pages.
International Patent Report on Patentability dated Jun. 29, 2023 from corresponding International Patent Application No. PCT/JP2021/045825, 13 pages.
Japanese Decision of Refusal dated Oct. 11, 2021 from corresponding Japanese Patent Application No. 2020-207707, 12 pages.
Japanese Trial and Appeal (Grant) Decision dated Nov. 8, 2021 from corresponding Japanese Patent Application No. 2020-207707, 4 pages.
Japanese Decision of Refusal dated Feb. 7, 2023 from corresponding Japanese Patent Application No. 2020-207707, 6 pages.

* cited by examiner

*Primary Examiner* — Kevin M Bernatz
(74) *Attorney, Agent, or Firm* — Ruggiero McAllister & McMahon LLC

(57) ABSTRACT

An aluminum alloy substrate for a magnetic disc is made of an aluminum alloy, containing Fe: 1.80 mass % or less, Mn: 0.70 mass % or less, Ni: 2.50 mass % or less, Si: 2.50 mass % or less, Cu: 1.00 mass % or less, Zn: 0.48 mass % or less and Mg: 1.00 to 3.50 mass %, wherein a total content of Fe, Mn and Ni is 1.60 to 4.50 mass % and a mass ratio of Cu/Zn is 0.01 to 0.35 or 6.00 to 50.00, with a balance being Al and inevitable impurities.

7 Claims, 1 Drawing Sheet

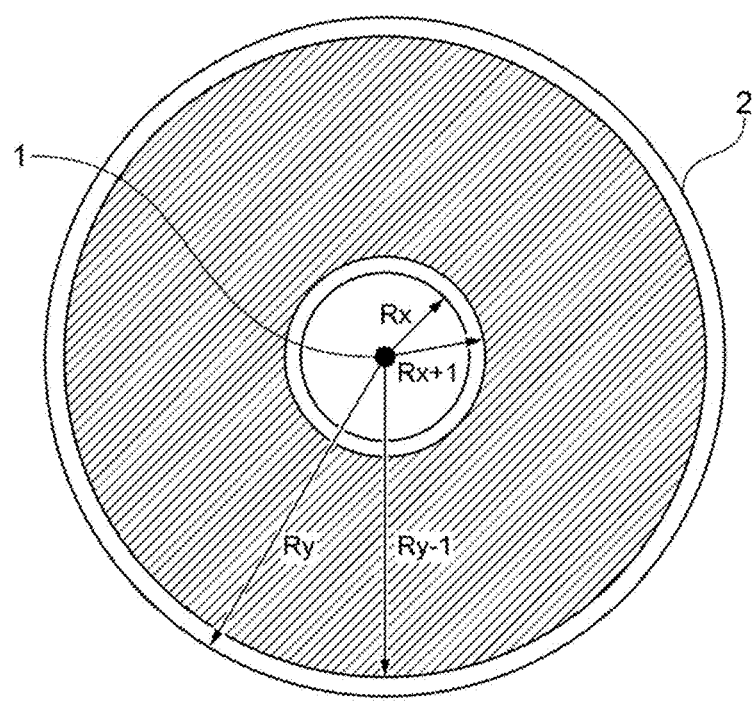

ALUMINUM ALLOY SUBSTRATE FOR MAGNETIC DISC AND MAGNETIC DISC

CROSS REFERENCE TO RELATED APPLICATIONS

The present application is a continuation application of International Patent Application No. PCT/JP2021/045825 filed on Dec. 13, 2021, which claims the benefit of Japanese Patent Application No. 2020-207707, filed on Dec. 15, 2020. The contents of these applications are incorporated herein by reference in their entirety.

BACKGROUND OF THE DISCLOSURE

1. Field of the Disclosure

The present disclosure relates to an aluminum alloy substrate for a magnetic disc and a magnetic disc.

2. Description of the Related Art

Magnetic discs that are used as storage devices for computers are manufactured using a substrate having a favorable plating property and being excellent in terms of mechanical characteristics or workability. They are manufactured from, for example, substrates or the like that are based on an aluminum alloy JIS 5086 (a composition containing Mg: 3.5 to 4.5 mass %, Fe: 0.50 mass % or less, Si: 0.40 mass % or less, Mn: 0.20 to 0.70 mass %, Cr: 0.05 to 0.25 mass %, Cu: 0.10 mass % or less, Ti: 0.15 mass % or less and Zn: 0.25 mass % or less, with the balance being Al and inevitable impurities).

Manufacturing of ordinary magnetic discs is performed by, first, producing an annular aluminum alloy substrate, performing plating on the aluminum alloy substrate and then attaching a magnetic body to the surface of the aluminum alloy substrate.

For example, an aluminum alloy magnetic disc made of the alloy specified by JIS 5086 is manufactured by the following manufacturing steps. First, an aluminum alloy material having predetermined chemical components is cast, and the resultant ingot is hot-rolled, then cold rolled, to produce a rolled material having a thickness necessary as a magnetic disc. It is preferable to perform annealing on this rolled material in the middle of the cold rolling or the like as necessary. Thereafter, this rolled material is blanked in an annular shape, and, in order to remove strain or the like generated by the manufacturing steps, press annealing is performed by performing annealing while pressing a laminate where aluminum alloy sheets having an annular shape are laminated from both surfaces to flatten the laminate, whereby an annular aluminum alloy substrate is produced.

On the annular aluminum alloy substrate produced as described above, cutting, grinding, degreasing, etching and a zincate treatment (Zn substitution treatment) are performed as pretreatments, and then Ni—P, which is a hard non-magnetic metal, is electroless-plated as a surface treatment, polishing is performed on the plated surface, and then a magnetic body is sputtered on the electroless Ni—P plated surface, whereby an aluminum alloy magnetic disc is manufactured.

An increase in capacity and an increase in density are demanded for magnetic discs in recent years due to needs from multimedia and the like. For an additional increase in the capacity, the number of magnetic discs that are mounted in a storage device increases, and accordingly, reduction in the thickness of the magnetic disc is also required.

However, thickness reduction or an increase in speed causes deterioration of stiffness or an increase in the fluid force due to high-speed rotation causes an increase in the exciting force, and disc flutter is likely to occur. This arises from the fact that, when magnetic discs are rotated at a high speed, an unstable air flow is generated between the discs, and the vibration of the magnetic discs (fluttering) occurs due to the air flow. Such a phenomenon is considered to occur since, when the loss factor of the substrate is low, the vibration of the magnetic discs becomes large, and the head is not capable of following the change. When fluttering occurs, the positioning error of the head, which is a reading unit, increases. Therefore, a decrease in disc flutter is strongly required.

Due to such circumstances, an aluminum alloy substrate for a magnetic disc having excellent fluttering characteristics has been strongly desired in recent years, and studies are underway. For example, in Japanese Patent Application Publication No. 2019-160384, a method in which the fluttering characteristics are improved by improving the loss factor of an aluminum alloy substrate and decreasing the flatness of the substrate has been proposed.

SUMMARY OF THE DISCLOSURE

Technical Problem

However, even with components of the aluminum alloy substrate that is disclosed in Japanese Patent Application Publication No. 2019-160384, intended favorable fluttering characteristics have not yet been thus far obtained.

The present disclosure has been made in consideration of the above-described circumstances, and the present disclosure provides an aluminum alloy substrate for a magnetic disc having excellent fluttering characteristics.

DETAILED DESCRIPTION OF THE DISCLOSURE

Solution to Problem

One aspect of the present disclosure is an aluminum alloy substrate for a magnetic disc made of an aluminum alloy containing Fe: 1.80 mass % or less, Mn: 0.70 mass % or less, Ni: 2.50 mass % or less, Si: 2.50 mass % or less, Cu: 1.00 mass % or less, Zn: 0.48 mass % or less and Mg: 1.00 to 3.50 mass %, wherein a total content of Fe, Mn and Ni is 1.60 to 4.50 mass % and a mass ratio of Cu/Zn is 0.01 to 0.35 or 6.00 to 50.00, with a balance being Al and inevitable impurities.

Another aspect of the present disclosure is the aluminum alloy substrate for a magnetic disc, wherein the aluminum alloy further contains one or two elements selected from the group consisting of Cr: 1.00 mass % or less and Zr: 1.00 mass % or less.

Still another aspect of the present disclosure is the aluminum alloy substrate for a magnetic disc, wherein the aluminum alloy further contains at least one element selected from the group consisting of Sr: 0.10 mass % or less, Na: 0.10 mass % or less and P: 0.10 mass % or less.

Far still another aspect of the present disclosure is the aluminum alloy substrate for a magnetic disc, wherein the aluminum alloy further contains 0.0020 mass % or less of Be.

Far still another aspect of the present disclosure is a magnetic disc including:

the aluminum alloy substrate for a magnetic disc;
a Ni—P plated layer on a surface of the aluminum alloy substrate for a magnetic disc; and
a magnetic body layer on the Ni—P plated layer.

Effects of Disclosure

According to the present disclosure, it is possible to provide an aluminum alloy substrate for a magnetic disc having excellent fluttering characteristics.

BRIEF DESCRIPTION OF THE DRAWING

FIG. 1 is a diagram showing a measurement range of flatness of an aluminum alloy substrate for a magnetic disc.

DESCRIPTION OF EMBODIMENTS

Aluminum Alloy Substrate for Magnetic Disc.

The present inventors have paid attention to the relationship between the fluttering characteristics of an aluminum alloy substrate for a magnetic disc and the material of the aluminum alloy substrate for a magnetic disc, intensively investigated and studied the relationship between these characteristics and the components of the substrate (magnetic disc material) and found that the composition of an aluminum alloy, the mass ratio of Cu/Zn, the total content of Fe, Mn and Ni and the Mg amount have a significant influence on the fluttering characteristics. As a result, the present inventors have found that, when an aluminum alloy forming the aluminum alloy substrate for a magnetic disc contains Fe: 1.80 mass % or less, Mn: 0.70 mass % or less, Ni: 2.50 mass % or less, Si: 2.50 mass % or less, Cu: 1.00 mass % or less, Zn: 0.48 mass % or less and Mg: 1.00 to 3.50 mass %, wherein the mass ratio of Cu/Zn is 0.01 to 0.35 or 6.00 to 50.00 and the total content of Fe, Mn and Ni is 1.60 to 4.50 mass %, with the balance being Al and inevitable impurities, it is possible to improve the fluttering characteristics of magnetic discs. That is, in the aluminum alloy substrate for a magnetic disc made of such an aluminum alloy, it is possible to increase the loss factor and to decrease flatness changes. It is possible to effectively inhibit the vibration of the magnetic discs during the rotation of the magnetic discs by increasing the loss factor of the aluminum alloy substrate for a magnetic disc. In addition, it is possible to effectively inhibit the generation of an unstable air flow during the rotation of the magnetic discs by decreasing the flatness change of the aluminum alloy substrate for a magnetic disc. As a result, the present inventors have found that the fluttering characteristics of the magnetic discs improve. Based on these findings, the present inventors have completed the present disclosure.

Hereinafter, an aluminum alloy substrate for a magnetic disc according to the present disclosure will be described in detail.

Alloy Composition of Aluminum Alloy.

In order to improve the fluttering characteristics, an aluminum alloy that is used in the aluminum alloy substrate for a magnetic disc according to the present disclosure contains Fe: 1.80 mass % or less, Mn: 0.70 mass % or less, Ni: 2.50 mass % or less, Si: 2.50 mass % or less, Cu: 1.00 mass % or less, Zn: 0.48 mass % or less and Mg: 1.00 to 3.50 mass %, wherein the total content of Fe, Mn and Ni is 1.60 to 4.50 mass % and the mass ratio of Cu/Zn is 0.01 to 0.35 or 6.00 to 50.00.

In addition, the aluminum alloy may further contain, as a second selective element, one or two elements selected from the group consisting of Cr: 1.00 mass % or less and Zr: 1.00 mass % or less.

Furthermore, the aluminum alloy may further contain, as a third selective element, at least one element selected from the group consisting of Sr: 0.10 mass % or less, Na: 0.10 mass % or less and P: 0.10 mass % or less.

Furthermore, the aluminum alloy may further contain, as a fourth selective element, 0.0020 mass % or less of Be. In a case where the aluminum alloy arbitrarily contains the second to fourth selective elements, the aluminum alloy contains Fe: 1.80 mass % or less, Mn: 0.70 mass % or less, Ni: 2.50 mass % or less, Si: 2.50 mass % or less, Cu: 1.00 mass % or less, Zn: 0.48 mass % or less, Mg: 1.00 to 3.50 mass %, Cr: 1.00 mass % or less, Zr: 1.00 mass % or less, Sr: 0.10 mass % or less, Na: 0.10 mass % or less, P: 0.10 mass % or less and Be: 0.0020 mass % or less, wherein the total content of Fe, Mn and Ni is 1.60 to 4.50 mass % and the mass ratio of Cu/Zn is 0.01 to 0.35 or 6.00 to 50.00, with the balance being Al and inevitable impurities. The aluminum alloy may or may not contain part or all of Cr, Zr, Sr, Na, P and Be.

Hereinafter, each of the above-described elements will be described.

Fe: Mainly as second phase particles (Al—Fe-based intermetallic compound or the like), some of Fe is present as a solid solution in the matrix and exhibits an effect of improving the loss factor, Young's modulus and strength of the aluminum alloy substrate for a magnetic disc. When vibration is applied to such a material, the vibration energy is rapidly absorbed by the interaction between the second phase particles and dislocations, and a favorable loss factor can be obtained. In addition, the second phase particles having a higher Young's modulus than the aluminum base material increase, whereby the Young's modulus improves. Furthermore, the second phase particles increase, whereby the strength improves by dispersion strength. The fact that the Fe content in the aluminum alloy is 1.80 mass % or less makes it possible to further enhance the effect of improving the loss factor, Young's modulus and strength of the aluminum alloy substrate for a magnetic disc. In addition, the generation of a number of coarse Al—Fe-based intermetallic compound particles is inhibited. As a result, it is possible to further enhance an effect of inhibiting the generation of large dents caused by the dropping of such coarse Al—Fe-based intermetallic compound particles during the etching, during the zincate treatment, during the cutting or during the grinding of the aluminum alloy substrate for a magnetic disc and improving the smoothness of the plating surface, and it is possible to further inhibit the occurrence of plating peeling. In addition, it is possible to further inhibit deterioration of the workability in a rolling step. Therefore, the Fe content in the aluminum alloy is set in a range of 1.80 mass % or less. The Fe content in the aluminum alloy is preferably 1.60 mass % or less. The lower limit of the Fe content in the aluminum alloy is preferably set to 0.10 mass % and more preferably set to 0.20 mass %.

Mn: Mn is present mainly as second phase particles (Al—Mn-based intermetallic compound or the like), some is present as a solid solution in the matrix and exhibits an effect of improving the loss factor, Young's modulus and strength of the aluminum alloy substrate for a magnetic disc. When vibration is applied to such a material, the vibration energy is rapidly absorbed by the interaction between the second phase particles and dislocations, and a favorable loss factor can be obtained. In addition, the second phase particles having a higher Young's modulus than the aluminum base material increase, whereby the Young's modulus improves. Furthermore, the second phase particles increase, whereby the strength of the aluminum alloy substrate for a magnetic disc improves by dispersion strength. The fact that the Mn content in the aluminum alloy is 0.70 mass % or less makes it possible to further enhance the effect of improving the loss factor, Young's modulus and strength of the aluminum alloy substrate for a magnetic disc. In addition, the generation of a number of coarse Al—Mn-based intermetallic compound particles is inhibited. As a result, it is possible to further enhance an effect of inhibiting the generation of large dents caused by the dropping of such coarse Al—Mn-based intermetallic compound particles during the etching, during the zincate treatment, during the cutting or during the grinding of the aluminum alloy substrate for a magnetic disc and improving the smoothness of the plating surface, and it is possible to further inhibit the occurrence of plating peeling. In addition, it is possible to further inhibit deterioration of the workability in the rolling step. Therefore, the Mn content in the aluminum alloy is set in a range of 0.70 mass % or less. The Mn content in the aluminum alloy is preferably 0.50 mass % or less. The lower limit of the Mn content in the aluminum alloy is preferably set to 0.10 mass % and more preferably set to 0.20 mass %.

Ni: Ni is present mainly as second phase particles (Al—Ni-based intermetallic compound or the like), some is present as a solid solution in the matrix and exhibits an effect of improving the loss factor, Young's modulus and strength of the aluminum alloy substrate for a magnetic disc.

The fact that the Ni content in the aluminum alloy is 2.50 mass % or less makes it possible to further enhance the effect of improving the loss factor, Young's modulus and strength of the aluminum alloy substrate for a magnetic disc. In addition, the generation of a number of coarse Al—Ni-based intermetallic compound particles is inhibited. As a result, the generation of large dents caused by the dropping of such coarse Al—Ni-based intermetallic compound particles during the etching, during the zincate treatment, during the cutting or during the grinding of the aluminum alloy substrate for a magnetic disc is inhibited, and it is possible to further inhibit deterioration of the smoothness of the plating surface and the occurrence of plating peeling. In addition, it is possible to further inhibit deterioration of the workability in the rolling step. Therefore, the Ni content in the aluminum alloy is set in a range of 2.50 mass % or less. The Ni content in the aluminum alloy is preferably 2.30 mass % or less. The lower limit of the Ni content in the aluminum alloy is preferably set to 0.10 mass % and more preferably set to 0.20 mass %.

Si: Si is present mainly as second phase particles (Si particles, Al—Fe—Si-based intermetallic compound or the like) and exhibits an effect of improving the loss factor, Young's modulus and strength of the aluminum alloy substrate for a magnetic disc. When vibration is applied to such an aluminum alloy substrate for a magnetic disc, the vibration energy is rapidly absorbed by the interaction between the second phase particles and dislocations, and a favorable loss factor can be obtained. In addition, the second phase particles having a higher Young's modulus than aluminum increase, whereby the Young's modulus improves. Furthermore, the second phase particles increase, whereby the strength of the aluminum alloy substrate for a magnetic disc improves by dispersion strength. The fact that the Si content in the aluminum alloy is 2.50 mass % or less makes it possible to further enhance the effect of improving the loss factor, Young's modulus and strength of the aluminum alloy substrate for a magnetic disc. In addition, the generation of a number of coarse Si particles is inhibited. It is possible to further enhance an effect of inhibiting the generation of large dents caused by the dropping of such coarse Si particles during the etching, during the zincate treatment, during the cutting or during the grinding of the aluminum alloy substrate for a magnetic disc and improving the smoothness of the plating surface, and it is possible to further inhibit the occurrence of plating peeling. In addition, it is possible to further inhibit deterioration of the workability in the rolling step. Therefore, the Si content in the aluminum alloy is set in a range of 2.50 mass % or less. The Si content is preferably 2.20 mass % or less. The lower limit of the Si content in the aluminum alloy is preferably set to 0.005 mass % and more preferably set to 0.01 mass %.

Cu: Cu is present mainly as second phase particles (Al—Cu-based intermetallic compound or the like) and is capable of increasing the loss factor of the aluminum alloy substrate for a magnetic disc depending on the ratio to Zn. In addition, an effect of improving the strength and Young's modulus of the aluminum alloy substrate for a magnetic disc is exhibited. In addition, the amount of Al dissolved during the zincate treatment of the aluminum alloy substrate for a magnetic disc is decreased. Furthermore, Cu uniformly, thinly and densely have a zincate coating attach to the aluminum alloy substrate and exhibits an effect of improving the smoothness in a plating step that is a subsequent step. The fact that the Cu content in the aluminum alloy is 1.00 mass % or less makes it possible to further enhance the effect of improving the loss factor, Young's modulus and strength of the aluminum alloy substrate for a magnetic disc and an effect of improving the smoothness. In addition, the generation of a number of coarse Al—Cu-based intermetallic compound particles is inhibited. As a result, it is possible to further enhance an effect of inhibiting the generation of large dents caused by the dropping of such coarse Al—Cu-based intermetallic compound particles during the etching, during the zincate treatment, during the cutting or during the grinding of the aluminum alloy substrate for a magnetic disc and improving the smoothness of the plating surface, and it is possible to further inhibit the occurrence of plating peeling. In addition, it is possible to further inhibit deterioration of the workability in the rolling step. Therefore, the Cu content in the aluminum alloy is set in a range of 1.00 mass % or less. The Cu content in the aluminum alloy is preferably 0.50 mass % or less. The lower limit of the Cu content in the aluminum alloy is preferably set to 0.003 mass % and more preferably set to 0.010 mass %.

Zn: Zn decreases the amount of Al dissolved during the zincate treatment, additionally, a zincate coating uniformly, thinly and densely attaches to the aluminum alloy substrate, and exhibits an effect of improving the smoothness and the tight contact property in the plating step that is the subsequent step. In addition, it is possible to increase the loss factor of the aluminum alloy substrate for a magnetic disc depending on the ratio to Cu. The fact that the Zn content in the aluminum alloy is 0.48 mass % or less makes it possible to further enhance the effect of improving the loss factor, flatness and tight contact property of the aluminum alloy substrate for a magnetic disc. In addition, it is possible to further inhibit deterioration of the workability in the rolling step. Therefore, the Zn content in the aluminum alloy is set in a range of 0.48 mass % or less. The Zn content in the aluminum alloy is preferably 0.40 mass % or less. The lower limit of the Zn content in the aluminum alloy is preferably set to 0.003 mass % and more preferably set to 0.010 mass %.

Mg: Mg is present as a solid solution mainly in the matrix, some is present as second phase particles (Mg—Si-based intermetallic compound or the like) and exhibits an effect of improving the strength of the aluminum alloy substrate for a magnetic disc. In addition, Mg has an effect of inhibiting the flatness change of the aluminum alloy substrate for a magnetic disc and exhibits an effect of improving the flatness. When the Mg content in the aluminum alloy is less than 1.00 mass %, the above-described effects are insufficient. On the other hand, when the Mg content in the aluminum alloy exceeds 3.50 mass %, the loss factor of the aluminum alloy substrate for a magnetic disc decreases. Therefore, the Mg content in the aluminum alloy is set within a range of 1.00 to 3.50 mass %. The Mg content is more preferably set within a range of 1.20 to 3.00 mass %.

Cr: Cr is present mainly as second phase particles (Al—Cr-based intermetallic compound or the like) and exhibits the effect of improving the loss factor, Young's modulus and strength of the aluminum alloy substrate for a magnetic disc. In addition, the fact that the Cr content in the aluminum alloy is 1.00 mass % or less makes it possible to further enhance the effect of improving the loss factor, Young's modulus and strength of the aluminum alloy substrate for a magnetic disc. In addition, the generation of a number of coarse Al—Cr-based intermetallic compound particles is inhibited. As a result, the generation of large dents caused by the dropping of such coarse Al—Cr-based intermetallic compound particles during the etching, during the zincate treatment, during the cutting or during the grinding of the aluminum alloy substrate for a magnetic disc is inhibited, and it is possible to further inhibit deterioration of the smoothness of the plating surface and the occurrence of plating peeling. In addition, it is possible to further inhibit deterioration of the workability in the rolling step. Therefore, the Cr content in the aluminum alloy is preferably set in a range of 1.00 mass % or less and more preferably set within a range of 0.03 to 0.50 mass %.

Zr: Zr is present mainly as second phase particles (Al—Zr-based intermetallic compound or the like) and exhibits the effect of improving the loss factor, Young's modulus and strength of the aluminum alloy substrate for a magnetic disc. The fact that the Zr content in the aluminum alloy is 1.00 mass % or less makes it possible to further enhance the effect of improving the loss factor, Young's modulus and strength of the aluminum alloy substrate for a magnetic disc. In addition, the generation of a number of coarse Al—Zr-based intermetallic compound particles is inhibited. As a result, the generation of large dents caused by the dropping of such coarse Al—Zr-based intermetallic compound particles during the etching, during the zincate treatment, during the cutting or during the grinding of the aluminum alloy substrate for a magnetic disc is inhibited, and it is possible to further inhibit deterioration of the smoothness of the plating surface and the occurrence of plating peeling. In addition, it is possible to further inhibit deterioration of the workability in the rolling step. Therefore, the Zr content in the aluminum alloy is preferably set in a range of 1.00 mass % or less and more preferably set within a range of 0.03 to 0.50 mass %.

Be: 0.0020 mass % or less.

Be is an element that is added to molten metal for the purpose of inhibiting the oxidation of Mg at the time of casting an aluminum alloy containing Mg. In addition, when Be that is contained in the aluminum alloy is set to 0.0020 mass % or less, it is possible to make a Zn coating that is formed on the surface of the aluminum alloy substrate for a magnetic disc in the manufacturing process of a magnetic disc denser and to further decrease the variation in thickness. As a result, it is possible to further enhance the smoothness of a Ni—P plated layer that is formed on the aluminum alloy substrate for a magnetic disc.

However, when the Be content in the aluminum alloy is excessively large, a Be-based oxide is likely to be formed on the surface when the aluminum alloy is heated in the manufacturing process of the aluminum alloy substrate for a magnetic disc. In addition, in a case where the aluminum alloy further contains Mg, an Al—Mg—Be-based oxide is likely to be formed on the surface when the aluminum alloy substrate for a magnetic disc has been heated. When the amount of these oxides becomes large, the variation in the thickness of the Zn coating becomes large, and there is a concern that the generation of a plating pit may result.

When the Be content in the aluminum alloy is preferably set to 0.0020 mass % or less and more preferably set to 0.0010 mass % or less, it is possible to reduce the amount of an Al—Mg—Be-based oxide and to further enhance the smoothness of the Ni—P plated layer. The lower limit value of the Be content may be 0 mass % (0.0000%).

Sr, Na and P: 0.10 mass % or less each.

Sr, Na and P refine second phase particles (mainly Si particles) in the aluminum alloy substrate for a magnetic disc and exhibit an effect of improving the plating property. In addition, Sr, Na and P also exhibit an effect of decreasing the unevenness in the sizes of the second phase particles in the aluminum alloy substrate for a magnetic disc and reducing the variation in impact resistance. Therefore, 0.10 mass % or less of each of Sr, Na and P may be contained in the aluminum alloy.

However, when more than 0.10 mass % of each of Sr, Na and P is contained, the above-described effects are saturated, and an additional significant effect cannot be obtained. In addition, in order to obtain the above-described effect, it is preferable to set the lower limit value of each of Sr, Na and P to 0.001 mass %.

Total of contents of Fe, Mn and Ni: 1.60 to 4.50 mass %.

As described above, Fe, Mn and Ni exhibit the effect of improving the loss factor, Young's modulus and strength of the aluminum alloy substrate for a magnetic disc. Here, when the total of the contents of Fe, Mn and Ni in the aluminum alloy is less than 1.60 mass %, the loss factor of the aluminum alloy substrate for a magnetic disc is insufficient, and the fluttering characteristics deteriorate. On the other hand, when the total of the contents of Fe, Mn and Ni exceeds 4.50 mass %, a coarse intermetallic compound is generated, during the etching, during the zincate treatment or during the processing of cutting or grinding of the aluminum alloy substrate for a magnetic disc, the intermetallic compound drops to generate large dents, and the smoothness of the plating surface deteriorates. In addition, when the total of the contents of Fe, Mn and Ni exceeds 4.50 mass %, the strength of the aluminum alloy substrate for a magnetic disc also becomes higher, and thus cracking is likely to occur during rolling. Therefore, the total of the contents of Fe, Mn and Ni is set to 1.60 to 4.50 mass %. The content is 1.60 to 4.50 mass % and preferably 1.90 to 4.00 mass % from the viewpoint of the balance among the stiffness, strength and manufacturability of the aluminum alloy substrate for a magnetic disc.

When the total content of the three elements (Fe, Mn and Ni) in the aluminum alloy satisfies 1.60 to 4.50 mass %, the range of the content of each of Fe, Mn and Ni is not particularly limited, and any one of Mn and Ni may be 0 mass %.

Mass ratio of Cu/Zn Being 0.01 to 0.35 or 6.00 to 50.00.

As described above, Cu and Zn exhibit the effect of improving the loss factor of the aluminum alloy substrate for a magnetic disc depending on the ratio therebetween. Here, when the mass ratio of Cu/Zn is more than 0.35 and less than 6.00, the loss factor of the aluminum alloy substrate for a magnetic disc is insufficient, and the fluttering characteristics deteriorate. On the other hand, when the Cu/Zn ratio is less than 0.01% or more than 50.00, a state where the content of any of Cu or Zn is large is formed, and there is a concern that the zincate coating becomes uneven and the plate smoothness may deteriorate. Therefore, the Cu/Zn ratio is set to 0.01 to 0.35 or 6.00 to 50.00. The Cu/Zn ratio is preferably set to 0.02 to 0.35 or 6.00 to 40.00 and more preferably 0.03 to 0.35 or 8.00 to 35.00 from the viewpoint of the balance with the loss factor or plate smoothness of the aluminum alloy substrate for a magnetic disc.

Other Elements:

In the aluminum alloy, elements that become inevitable impurities other than the above-described elements may be contained. Examples of these elements include Ti, B, Ga and the like, and, as long as the content of each element is 0.10 mass % or less and the total content is 0.30 mass % or less, effects of the present disclosure are not impaired.

The intermetallic compounds mean precipitates or crystallized substances and specifically refer to the particles or the like such as Al—Fe-based intermetallic compounds ($Al_3Fe$, $Al_6Fe$, $Al_6(Fe, Mn)$, Al—Fe—Si, Al—Fe—Mn—Si, Al—Fe—Ni, Al—Cu—Fe and the like), Mg—Si-based intermetallic compounds ($Mg_2Si$ and the like). Examples of other intermetallic compounds include Al—Mn-based intermetallic compounds ($Al_6Mn$, Al—Mn—Si), Al—Ni-based intermetallic compounds ($Al_3Ni$ and the like), Al—Cu-based intermetallic compounds ($Al_2Cu$ and the like), Al—Cr-based intermetallic compounds ($Al_7Cr$ and the like), Al—Zr-based intermetallic compounds ($Al_3Zr$ and the like) and the like. The second phase particles also include, aside from the intermetallic compounds, Si particles and the like.

Loss Factor of Aluminum Alloy Substrate for Magnetic Disc.

The aluminum alloy substrate for a magnetic disc according to the present disclosure increases and improves the loss factor. Therefore, it becomes possible to effectively inhibit the vibration of magnetic discs during the rotation of the magnetic discs, and the effect of improving the fluttering characteristics of the aluminum alloy substrate for a magnetic disc is exhibited. As described above, when the second phase particles of the material are increased, the vibration energy is rapidly absorbed by the interaction between the second phase particles and dislocations, and a favorable loss factor can be obtained.

"Loss factor" is a value obtained by dividing the natural logarithm of the ratio between adjacent amplitudes of a damped free vibration waveform by $\pi$, and, when an $n^{th}$ amplitude at a time to is indicated by an, and, similarly, $n+1^{th}$, ... $n+m^{th}$ amplitudes are indicated by $a_{n+1}, \ldots a_{n+m}$, the loss factor is represented by $\{(1/m) \times \ln(a_n/a_{n+m})\}/\pi$. The measurement of the loss factor can be performed at room temperature using, for example, a JE-RT type device manufactured by Nihon Techno-Plus Co., Ltd.

Flatness of Aluminum Alloy Substrate for Magnetic Disc.

The flatness of the aluminum alloy substrate for a magnetic disc is measured as described below. First, the flatness of the aluminum alloy substrate for a magnetic disc was measured, then, the aluminum alloy substrate for a magnetic disc was placed flat on a surface plate or the like and left to stand at room temperature (25±5° C.) for 336 hours, the flatness was measured again, and the difference in the flatness before and after being left to stand at room temperature, which is represented by the following expression, was calculated as a flatness change.

The flatness change is the absolute value of {(flatness of aluminum alloy substrate for magnetic disc before being held at 25±5° C. for 336 hours)−(flatness of aluminum alloy substrate for magnetic disc after being held at 25±5° C. for 336 hours)}.

In addition, the measurement of the flatness can be performed with, for example, a flatness measuring instrument (MESA) manufactured by ZyGO Corporation. In the aluminum alloy substrate for a magnetic disc according to the present disclosure, the flatness is small. When the flatness is decreased, air resistance during the rotation of magnetic discs is effectively inhibited, and an effect of improving the fluttering characteristics of the aluminum alloy substrate for a magnetic disc is exhibited. With the aluminum alloy substrate for a magnetic disc having a large flatness, air resistance during the operation of magnetic disc devices becomes large, and the fluttering characteristics deteriorate. On the other hand, with the aluminum alloy substrate for a magnetic disc having a small flatness, it is possible to inhibit the deterioration of the fluttering characteristics as described above.

The flatness in the present disclosure is represented by a difference between the maximum crest height and the maximum trough depth of the entire surface of the aluminum alloy substrate for a magnetic disc. Here, the maximum crest height is the difference between the average line of the contour line in the measurement range and the highest value in the measurement range, and the maximum trough depth is the difference between the average line and the lowest value in the measurement range. Here, FIG. 1 is a diagram showing the measurement range of the flatness of an aluminum alloy substrate for a magnetic disc 2. As shown in FIG. 1, when the radius from a center 1 of the aluminum alloy substrate for a magnetic disc to the inner diameter of the aluminum alloy substrate for a magnetic disc 2 is represented by Rx (mm), and the radius from the center 1 of the aluminum alloy substrate for a magnetic disc 2 to the outer diameter of the aluminum alloy substrate for a magnetic disc 2 is represented by Ry (mm), a region surrounded by a circle of Rx+1 (mm) and a circle of Ry−1 (mm) becomes the measurement range.

B. Magnetic Disc.

A magnetic disc including the aluminum alloy substrate for a magnetic disc has, for example, the following configuration. That is, the magnetic disc includes the aluminum alloy substrate for a magnetic disc, a Ni—P plated layer on the surface of this aluminum alloy substrate for a magnetic disc and a magnetic body layer on this Ni—P plated layer. The Ni—P plated layer is preferably an electroless Ni—P plated layer formed by electroless plating. The magnetic disc may further include a protective layer laminated on the magnetic body layer and made of a carbon-based material such as diamond-like carbon; and a lubricating layer made of a lubricant and applied on the protective layer.

C. Method for Manufacturing Aluminum Alloy Substrate for Magnetic Disc and Magnetic Disc.

Hereinafter, each step of the manufacturing steps of the aluminum alloy substrate for a magnetic disc according to the present disclosure and a magnetic disc using the same and process conditions will be described in detail.

A method for manufacturing the aluminum alloy substrate for a magnetic disc according to the present disclosure and the magnetic disc using the same will be described below. Here, the adjustment of aluminum alloy components through cold rolling are steps for manufacturing the aluminum alloy substrate for a magnetic disc. In addition, the production of a disc blank made of the aluminum alloy substrate for a magnetic disc through the attachment of a magnetic body are steps for producing a magnetic disc from the manufactured aluminum alloy substrate for a magnetic disc.

First, molten metal of an aluminum alloy material having the above-described component composition is prepared by heating and melting according to a normal method. Next, an aluminum alloy is cast from the prepared molten metal of the aluminum alloy material by a semi-continuous casting (DC casting) method, a continuous casting (CC casting) method or the like. Here, the DC casting method and the CC casting method are as described below.

In the DC casting method, the molten metal poured through a spout is robbed of heat with cooling water that is directly discharged to a bottom block, the wall of a mold cooled with water and the outer periphery of an ingot, solidified and drawn downward as an ingot.

In the CC casting method, the molten metal is supplied to a portion between a pair of rolls (or belt casters, block casters) through a casting nozzle, and a thin sheet is directly cast by removing heat from the rolls.

A large difference between the DC casting method and the CC casting method lies in the cooling rate during casting. A feature of the CC casting method where the cooling rate is fast is that the sizes of the second phase particles are small compared with those in DC casting. In both casting methods, it is preferable to set the cooling rate during casting within a range of 0.1 to 1000° C./s. When the cooling rate during casting is set to 0.1 to 1000° C./s, a number of second phase particles are generated, and the loss factor and Young's modulus of the aluminum alloy substrate for a magnetic disc improve. In addition, the amount of a Fe solid solution in the aluminum alloy becomes large, and it is possible to obtain an effect of improving the strength. When the cooling rate during casting is slower than 0.1° C./s, the amount of a Fe solid solution becomes small, and there is a concern that the strength of the aluminum alloy substrate for a magnetic disc may decrease. On the other hand, when the cooling rate during casting is faster than 1000° C./s, there is a concern that the number of the second phase particles may become small, and there are cases where an aluminum alloy substrate for a magnetic disc having sufficient loss factor and Young's modulus cannot be obtained.

Next, a homogenization treatment is performed on the DC-cast aluminum alloy ingot as necessary. In the case of performing the homogenization treatment, it is preferable to perform a heating treatment at 280° C. to 620° C. for 0.5 to 30 hours, and it is more preferable to perform a heating treatment at 300° C. to 620° C. for one to 24 hours. In a case where the heating temperature is lower than 280° C. or the heating time is shorter than 0.5 hours during the homogenization treatment, there is a concern that the homogenization treatment is insufficient and the variation in loss factor among the aluminum alloy substrates for a magnetic disc may become large. When the heating temperature during the homogenization treatment exceeds 620° C., there is a concern that the aluminum alloy ingot may be melted. When the heating time during the homogenization treatment exceeds 30 hours, the effects obtained thereby are saturated and a more significant improvement effects cannot be obtained.

Thereafter, the aluminum alloy ingot on which the homogenization treatment has been performed as necessary or the homogenization treatment is not performed is hot-rolled and made into a sheet material. Upon the hot rolling, the conditions are not particularly limited, but the hot rolling start temperature is preferably set to 250° C. to 600° C., and the hot rolling end temperature is preferably set to 230° C. to 450° C.

Thereafter, the rolled sheet obtained by hot rolling or the cast sheet cast by the continuous casting method is cold-rolled to produce an approximately 1.3 mm to 0.45 mm aluminum alloy substrate for a magnetic disc. By cold rolling, a desired product sheet thickness is achieved. The conditions of the cold rolling are not particularly limited and may be determined depending on a necessary product sheet strength or sheet thickness, and it is preferable to set the rolling rate to 10% to 95%. Before the cold rolling or in the middle of the cold rolling, an annealing treatment may be performed to ensure cold rollability. In the case of performing the annealing treatment, for example, for batch-type heating, it is preferable to perform the annealing treatment under conditions of 300° C. to 450° C. and 0.1 to 10 hours, and, for continuous heating, it is preferable to perform the annealing treatment under conditions of holding at 400° C. to 500° C. for 0 to 60 seconds. Here, the holding time being 0 seconds means that the sheet is cooled immediately after a desired holding temperature is reached.

In order to process the aluminum alloy substrate for a magnetic disc for magnetic discs, the aluminum alloy substrate for a magnetic disc is blanked in an annular shape, and a disc blank made of the aluminum alloy substrate for a magnetic disc is produced. Thereafter, the disc blank is flattened by performing press annealing in the atmosphere, for example, at 150° C. to 270° C. for 0.5 to 10 hours. Thereafter, cutting and grinding are performed on the disc blank made of the aluminum alloy substrate for a magnetic disc, and a heating treatment of holding the disc blank within a range of 130° C. to 280° C. for 0.5 to 10.0 hours is performed.

When the heating treatment of holding the disc blank within a range of 130° C. to 280° C. for 0.5 to 10.0 hours is performed as described above, it becomes possible to inhibit a decrease of dislocations necessary for the improvement of the loss factor of the aluminum alloy substrate for a magnetic disc, and it is possible to improve the fluttering characteristics. In a case where the heating treatment temperature exceeds 280° C. or the heating treatment time exceeds 10.0 hours, dislocations decrease, as a result, the loss factor of the aluminum alloy substrate for a magnetic disc decreases, and the fluttering characteristics deteriorate. On the other hand, in a case where the heating treatment temperature is lower than 130° C. or the heating treatment time is shorter than 0.5 hours, the removal of strain introduced by processing becomes insufficient, as a result, the flatness of the aluminum alloy substrate for a magnetic disc deteriorates due to a temporal change, and it becomes difficult to use the resultant aluminum alloy substrate for a magnetic disc as an aluminum alloy substrate for a magnetic disc. Therefore, in the heating treatment of the disc blank after cutting and grinding, it is preferable to perform the holding within a range of 130° C. to 280° C. for 0.5 to 10.0 hours. In addition, the temperature range in the heating treatment is more preferably 180° C. to 250° C., and the holding time is more preferably 0.5 to 5.0 hours.

Thereafter, degreasing, etching and a zincate treatment (Zn substitution treatment) are performed on the surface of the disc blank made of the aluminum alloy substrate for a magnetic disc. Furthermore, as a surface treatment, electroless Ni—P plating is performed on the treated surface of the zincate-treated disc blank made of the aluminum alloy substrate for a magnetic disc. Finally, a magnetic body is attached to the electroless Ni—P plated surface by sputtering to produce a magnetic disc.

EXAMPLES

Hereinafter, examples of an aluminum alloy substrate for a magnetic disc and a method for manufacturing the same will be described. A specific aspect of the aluminum alloy substrate for a magnetic disc and the method for manufacturing the same is not limited to an aspect of the examples to be described below, and it is possible to modify the configuration as appropriate from the examples to an extent that the gist of the present disclosure is not impaired.

Production of Aluminum Alloy Sheet.

Aluminum alloy sheets that were used for evaluation in the present examples were produced by the following method. First, molten metals containing chemical components shown in Table 1 were prepared in a melting furnace.

mately 0.7 mm were obtained. In Alloy No. B11, since the total content of Fe, Mn and Ni amount was too large, and the strength was too high, cracking occurred during the hot rolling, and it was not possible to use the alloy as a magnetic disc. Therefore, in Comparative Example 11 where Alloy No. B11 was used, hot rolling and cold rolling were not performed, and press annealing was not performed, and thus it was not possible to perform the evaluation of the loss factor and the flatness change to be described below. For Comparative Example 11, since the treatments until the middle of the hot rolling were performed as described above, only "hot rolling start temperature" is shown in Table 2. In addition, in Alloy Nos. B8 and B9, since the Mn amounts were too large, and the strengths were too high, cracking occurred during the rolling, and the alloys were not suitable as magnetic discs, but evaluation was possible, and thus the following evaluation of the loss factor and the flatness change was performed.

(2) Production of Aluminum Alloy Substrate for Magnetic Disc.

Blanking was performed on the aluminum alloy substrates for a magnetic disc, thereby obtaining disc blanks having an

TABLE 1

| | | Alloy composition (mass %) | | | | | | | | | | | | | | | |
|---|---|---|---|---|---|---|---|---|---|---|---|---|---|---|---|---|---|
| | Alloy No. | Si | Fe | Cu | Mn | Mg | Cr | Zn | Ti | Zr | Be | Ni | Sr | Na | P | Fe + Mn + N | Cu/ Zn | Al + Inevitable impurity |
| Example 1 | A1 | 0.06 | 0.69 | 0.24 | 0.29 | 1.59 | 0.16 | 0.01 | 0.01 | 0.00 | 0.0006 | 1.83 | 0.00 | 0.00 | 0.00 | 2.81 | 31.47 | Balance |
| Example 2 | A2 | 0.05 | 0.73 | 0.02 | 0.33 | 1.48 | 0.00 | 0.37 | 0.01 | 0.00 | 0.0004 | 1.86 | 0.00 | 0.00 | 0.00 | 2.92 | 0.05 | Balance |
| Example 3 | A3 | 0.06 | 0.70 | 0.02 | 0.34 | 2.80 | 0.00 | 0.38 | 0.01 | 0.00 | 0.0003 | 1.80 | 0.00 | 0.00 | 0.00 | 2.84 | 0.06 | Balance |
| Comparative Example 1 | B1 | 0.09 | 0.19 | 0.01 | 1.08 | 2.03 | 0.00 | 0.33 | 0.0046 | 0.00 | 0.0006 | 0.00 | 0.02 | 0.01 | 0.001 | 1.28 | 0.03 | Balance |
| Comparative Example 2 | B2 | 0.06 | 1.49 | 0.22 | 0.39 | 0.00 | 0.00 | 0.01 | 0.01 | 0.00 | 0.0000 | 0.00 | 0.00 | 0.00 | 0.00 | 1.88 | 38.80 | Balance |
| Comparative Example 3 | B3 | 0.07 | 1.47 | 0.12 | 0.38 | 0.00 | 0.00 | 0.36 | 0.01 | 0.00 | 0.0000 | 0.00 | 0.00 | 0.00 | 0.00 | 1.85 | 0.33 | Balance |
| Comparative Example 4 | B4 | 0.07 | 1.50 | 0.20 | 0.39 | 0.00 | 0.00 | 0.69 | 0.01 | 0.00 | 0.0000 | 0.00 | 0.00 | 0.00 | 0.00 | 1.89 | 0.29 | Balance |
| Comparative Example 5 | B5 | 0.07 | 1.48 | 0.12 | 0.40 | 0.00 | 0.00 | 0.01 | 0.01 | 0.00 | 0.0000 | 0.00 | 0.00 | 0.00 | 0.00 | 1.88 | 9.59 | Balance |
| Comparative Example 6 | B6 | 2.03 | 1.38 | 0.02 | 0.35 | 0.00 | 0.00 | 0.35 | 0.01 | 0.00 | 0.0000 | 0.01 | 0.00 | 0.00 | 0.00 | 1.74 | 0.05 | Balance |
| Comparative Example 7 | B7 | 2.00 | 1.38 | 0.02 | 0.36 | 0.00 | 0.00 | 0.34 | 0.01 | 0.00 | 0.0000 | 0.95 | 0.00 | 0.00 | 0.00 | 2.69 | 0.06 | Balance |
| Comparative Example 8 | B8 | 0.07 | 0.73 | 0.93 | 1.00 | 0.00 | 0.00 | 0.37 | 0.00 | 0.00 | 0.0000 | 1.79 | 0.00 | 0.00 | 0.00 | 3.52 | 2.52 | Balance |
| Comparative Example 9 | B9 | 0.06 | 0.70 | 0.02 | 0.92 | 0.00 | 0.00 | 0.39 | 0.00 | 0.00 | 0.0000 | 1.37 | 0.00 | 0.00 | 0.00 | 2.99 | 0.04 | Balance |
| Comparative Example 10 | B10 | 0.02 | 0.02 | 0.02 | 0.00 | 4.00 | 0.05 | 0.31 | 0.00 | 0.00 | 0.0002 | 0.00 | 0.00 | 0.00 | 0.00 | 0.02 | 0.06 | Balance |
| Comparative Example 11 | B11 | 0.06 | 8.00 | 0.02 | 0.00 | 0.00 | 0.00 | 0.33 | 0.01 | 0.00 | 0.0000 | 0.00 | 0.00 | 0.00 | 0.00 | 8.00 | 0.06 | Balance |
| Comparative Example 12 | B11 | 0.07 | 0.27 | 0.14 | 1.00 | 2.44 | 0.00 | 0.32 | 0.00 | 0.00 | 0.0003 | 0.00 | 0.00 | 0.00 | 0.00 | 1.27 | 0.44 | Balance |

Thereafter, the molten metals in the melting furnace were moved, and ingots were produced by casting methods shown in Table 2. Next, except Alloy Nos. B8 and B9, the surfaces of the ingots were faced, and segregation layers present on the ingot surfaces were removed. Except Alloy Nos. B8 and B9, a homogenization treatment was performed by performing a heating treatment on the ingots on which the facing had been performed under conditions shown in Table 2. Next, hot rolling was performed on alloys other than Alloy Nos. B8 and B9 under conditions shown in Table 2 to obtain hot rolled sheets having a thickness of 3 mm. Furthermore, cold rolling was performed using the hot rolled sheets or CC cast sheets, and cold rolled sheets having a thickness of approxiannular shape with an outer diameter of 98 mm and an inner diameter of 24 mm. Next, the obtained disc blanks were held at temperatures shown in Table 2 for three hours while being pressurized from both sides in the thickness direction to perform press annealing.

Loss Factor.

A 60 mm×8 mm sample was collected from the disc blank made of the aluminum alloy substrate for a magnetic disc after the press annealing step, the loss factor was measured by a decay time method of factor, and the loss factor×the sheet thickness (mm) was calculated. An appropriate value of the loss factor of the aluminum alloy substrate for a magnetic disc significantly changes depending on the sheet thickness of the substrate. This is because, as the sheet thickness becomes thinner, resistance to an excitation force by a fluid is further lost. Therefore, evaluation is performed by the product of the loss factor and the sheet thickness (unit: mm). The measurement of the loss factor was performed at room temperature using a JE-RT type device manufactured by Nihon Techno-Plus Co., Ltd. Regarding the evaluation of the fluttering characteristics, a case where the loss factor×the sheet thickness (mm) was $0.89 \times 10^{-3}$ or more was regarded was A (excellent), $0.74 \times 10^{-3}$ or more and less than $0.89 \times 10^{-3}$ was regarded as B (favorable), $0.69 \times 10^{-3}$ or more and less than $0.74 \times 10^{-3}$ was regarded as C (acceptable), and less than $0.69 \times 10^{-3}$ was regarded as D (poor). The evaluation of the loss factor may be performed on a test piece collected from the aluminum alloy substrate for a magnetic disc for which plating had been peeled off from the magnetic disc after the heating treatment and the surface had been ground 10 μm. It has been confirmed by a preliminary test that a sample obtained from the magnetic disc after the heating treatment shows the same loss factor as that of a sample collected from the aluminum alloy substrate for a magnetic disc after the press annealing step. The obtained results of the loss factor×the sheet thickness (mm) are shown in Table 2.

Flatness Change Investigation.

First, for a blank made of the aluminum alloy substrate for a magnetic disc that had been subjected to press annealing as described above, the flatness was measured. After that, the aluminum alloy substrate for a magnetic disc was placed flat on a surface plate or the like and left to stand at room temperature (25±5° C.) for 336 hours, the flatness was measured again, and the difference in the flatness before and after being left to stand at room temperature, which is represented by the following expression, was calculated as a flatness change.

Flatness change=absolute value of {(flatness of aluminum alloy substrate for magnetic disc before being held at 25±5° C. for 336 hours)−(flatness of aluminum alloy substrate for magnetic disc after being held at 25±5° C. for 336 hours)}.

The definition of the flatness is as described above. In addition, the measurement of the flatness was performed with a ZyGO non-contact flatness measuring instrument. In a case where the flatness change was 2.00 μm or less, evaluation was A (excellent), and, in a case where the flatness change exceeded 2.00 μm, evaluation was D (poor). The obtained results of the flatness change are shown in Table 2.

TABLE 2

| | Alloy No. | Casting method | Homogenization treatment temperature (° C.) | Homogenization treatment time (h) | Hot rolling start temperature (° C.) | Hot rolling end temperature (° C.) | Sheet thickness after hot rolling (mm) |
|---|---|---|---|---|---|---|---|
| Example 1 | A1 | Mold casting | 520 | 7 | 520 | 280 | 3 |
| Example 2 | A2 | Mold casting | 550 | 4 | 500 | 280 | 3 |
| Example 3 | A3 | Mold casting | 550 | 4 | 550 | 280 | 3 |
| Comparative Example 1 | B1 | Mold casting | 540 | 4 | 540 | 280 | 3 |
| Comparative Example 2 | B2 | Mold casting | 600 | 4 | 450 | 280 | 3 |
| Comparative Example 3 | B3 | Mold casting | 600 | 4 | 450 | 280 | 3 |
| Comparative Example 4 | B4 | Mold casting | 600 | 4 | 450 | 280 | 3 |
| Comparative Example 5 | B5 | Mold casting | 600 | 4 | 450 | 280 | 3 |
| Comparative Example 6 | B6 | Mold casting | 320 | 2 | 320 | 280 | 3 |
| Comparative Example 7 | B7 | Mold casting | 320 | 2 | 320 | 280 | 3 |
| Comparative Example 8 | B8 | CC casting | — | — | — | — | — |
| Comparative Example 9 | B9 | CC casting | — | — | — | — | — |
| Comparative Example 10 | B10 | DC casting | 550 | 4 | 450 | 350 | 3 |
| Comparative Example 11 | B11 | Mold casting | 550 | 2 | 550 | — | — |
| Comparative Example 12 | B12 | DC casting | 540 | 4 | 540 | 280 | 3 |

| | Total rolling reduction of cold rolling (%) | Press annealing temperature (° C.) | Loss factor × sheet thickness ×10⁻³ (mm) | Evaluation of loss factor | Flatness change (μm) | Evaluation of flatness change |
|---|---|---|---|---|---|---|
| Example 1 | 75 | 320 | 0.83 | B | 0.4 | A |
| Example 2 | 75 | 320 | 0.79 | B | 0.08 | A |
| Example 3 | 75 | 320 | 0.69 | C | 0.27 | A |
| Comparative Example 1 | 75 | 320 | 0.68 | D | 0.02 | A |
| Comparative Example 2 | 75 | 250 | 1.03 | A | 3.51 | D |

TABLE 2-continued

| | | | | | | |
|---|---|---|---|---|---|---|
| Comparative Example 3 | 75 | 250 | 1.02 | A | 2.53 | D |
| Comparative Example 4 | 75 | 250 | 1.06 | A | 2.63 | D |
| Comparative Example 5 | 75 | 250 | 1.04 | A | 2.44 | D |
| Comparative Example 6 | 75 | 250 | 1.35 | A | 4.99 | D |
| Comparative Example 7 | 75 | 320 | 1.32 | A | 3.15 | D |
| Comparative Example 8 | 88 | 320 | 0.63 | D | 2.05 | D |
| Comparative Example 9 | 88 | 320 | 1.36 | A | 5.92 | D |
| Comparative Example 10 | 75 | 320 | 0.58 | D | 0.15 | A |
| Comparative Example 11 | — | — | — | — | — | — |
| Comparative Example 12 | 75 | 320 | 0.67 | D | 0.42 | A |

As shown in Table 2, in all of Examples 1 to 3, the evaluations of the loss factor×the sheet thickness were "B" or "C", the evaluations of the flatness change were as excellent as "A", and it was possible to obtain aluminum alloy substrates for a magnetic disc having favorable fluttering characteristics.

In contrast, as shown in Table 2, in Comparative Examples 1 to 10 and 12, since any or both of the loss factor×the sheet thickness and the flatness change were as poor as "D", it was not possible to obtain aluminum alloy substrates for a magnetic disc having favorable fluttering characteristics. In addition, in Comparative Example 11, it was not possible to perform the evaluations of the loss factor×the sheet thickness and the flatness change themselves.

According to the present disclosure, an aluminum alloy substrate for a magnetic disc having excellent fluttering characteristics and a magnetic disc using the same can be obtained.

The invention claimed is:

1. An aluminum alloy substrate for a magnetic disc made of an aluminum alloy, comprising Fe: 0.10 mass % or more and 1.80 mass % or less, Mn: 0.10 mass % or more and 0.70 mass % or less, Ni: 0.10 mass % more and 2.50 mass % or less, Si: 2.50 mass % or less, Cu: 0.003 mass % or more and 1.00 mass % or less, Zn: 0.003 more and 0.48 mass % or less and Mg: 1.00 to 3.50 mass %, wherein Fe, Mn and Ni has a total content that is 1.60 to 4.50 mass % and a mass ratio of Cu/Zn is 0.01 to 0.35 or 6.00 to 50.00, with a balance being Al and inevitable impurities.

2. The aluminum alloy substrate for a magnetic disc according to claim 1, wherein the aluminum alloy further comprises one or two elements selected from the group consisting of Cr: 1.00 mass % or less and Zr: 1.00 mass % or less.

3. The aluminum alloy substrate for a magnetic disc according to claim 1, wherein the aluminum alloy further comprises at least one element selected from the group consisting of Sr: 0.10 mass % or less, Na: 0.10 mass % or less and P: 0.10 mass % or less.

4. The aluminum alloy substrate for a magnetic disc according to claim 1, wherein the aluminum alloy further comprises 0.0020 mass % or less of Be.

5. A magnetic disc comprising:
the aluminum alloy substrate for a magnetic disc according to claim 1;
a Ni—P plated layer on a surface of the aluminum alloy substrate for a magnetic disc; and
a magnetic body layer on the Ni—P plated layer.

6. The aluminum alloy substrate for a magnetic disc according to claim 1, wherein the aluminum alloy is free of Cr.

7. The aluminum alloy substrate for a magnetic disc according to claim 1, wherein the aluminum alloy includes 0.005 mass % or more and 0.06 mass % or less of Si.

* * * * *